(12) United States Patent
Suzuki et al.

(10) Patent No.: US 9,967,488 B2
(45) Date of Patent: May 8, 2018

(54) PHOTOELECTRIC CONVERSION DEVICE, IMAGE READING DEVICE, AND IMAGE FORMING APPARATUS

(71) Applicant: CANON KABUSHIKI KAISHA, Tokyo (JP)

(72) Inventors: Tatsuya Suzuki, Kawasaki (JP); Masanori Ogura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 15/208,397

(22) Filed: Jul. 12, 2016

(65) Prior Publication Data

US 2017/0019619 A1    Jan. 19, 2017

(30) Foreign Application Priority Data

Jul. 16, 2015    (JP) ................................. 2015-142508

(51) Int. Cl.
*H04N 5/369* (2011.01)
*H04N 1/028* (2006.01)
*H04N 5/378* (2011.01)

(52) U.S. Cl.
CPC ....... *H04N 5/3698* (2013.01); *H04N 1/02805* (2013.01); *H04N 1/02855* (2013.01); *H04N 5/3694* (2013.01); *H04N 5/378* (2013.01); *H04N 2201/0081* (2013.01); *H04N 2201/0082* (2013.01); *H04N 2201/0094* (2013.01); *H04N 2201/03112* (2013.01); *H04N 2201/03145* (2013.01)

(58) Field of Classification Search
CPC .. H04N 5/378; H04N 1/02805; H04N 5/3698; H04N 19/10; H04N 19/423; H04N 19/44; H04N 19/513; H04N 19/65; H04N 1/028; H04N 1/02855; H04N 1/0313; H04N 1/0314; H04N 2201/0081; H04N 2201/0082
USPC ........................ 358/1.14, 1.15, 474, 404, 442
See application file for complete search history.

(56) References Cited

U.S. PATENT DOCUMENTS

| | | | | |
|---|---|---|---|---|
| 6,094,094 A * | 7/2000 | Ohtake | ................... | G05F 3/205 327/560 |
| 6,107,830 A * | 8/2000 | Okumura | ......... | H03K 19/00315 326/58 |
| 9,496,042 B1* | 11/2016 | Abiko | ..................... | G11C 16/10 |
| 2007/0142081 A1* | 6/2007 | Lindqvist | ........... | G03B 15/0447 455/556.1 |
| 2007/0176642 A1* | 8/2007 | Kursun | .............. | H03K 19/0966 326/98 |
| 2007/0263250 A1* | 11/2007 | Koiwai | ................. | G06F 1/3203 358/1.15 |
| 2007/0285122 A1* | 12/2007 | Si | .............................. | G06F 1/26 326/38 |

(Continued)

FOREIGN PATENT DOCUMENTS

JP        2008-160344 A    7/2008
JP        2014-75620 A     4/2014

*Primary Examiner* — Negussie Worku
(74) *Attorney, Agent, or Firm* — Canon U.S.A., Inc. IP Division

(57) ABSTRACT

A photoelectric conversion device includes a current consumption circuit configured to consume current such that a difference between a current consumption during a blanking period and a current consumption during a standby period is reduced.

18 Claims, 14 Drawing Sheets

(56) References Cited

U.S. PATENT DOCUMENTS

| | | | | |
|---|---|---|---|---|
| 2012/0320244 A1* | 12/2012 | Hagihara | .............. | H03M 1/002 348/294 |
| 2013/0332758 A1* | 12/2013 | Sasaki | ..................... | G06F 1/324 713/322 |
| 2016/0070327 A1* | 3/2016 | Nemani | ................... | G06F 1/324 713/300 |
| 2016/0173031 A1* | 6/2016 | Langer | ................... | H03F 1/0205 330/126 |
| 2016/0329823 A1* | 11/2016 | Nakamura | ........ | H02M 3/33561 |

* cited by examiner

PHOTOELECTRIC CONVERSION DEVICE, IMAGE READING DEVICE, AND IMAGE FORMING APPARATUS

BACKGROUND OF THE INVENTION

Field of the Invention

The present invention relates to a photoelectric conversion device, an image reading device, and an image forming apparatus.

Description of the Related Art

Photoelectric conversion devices which perform photoelectric conversion of incident light have been known.

As an example of photoelectric conversion devices, an image capturing device which includes a plurality of photoelectric conversion units configured to output optical signals, and a plurality of column circuits configured to be provided in association with the plurality of photoelectric conversion units and include amplification transistors is disclosed in Japanese Patent Laid-Open No. 2014-75620. The image capturing device further includes an output circuit configured to output a signal based on an optical signal. The image capturing device has a first state in which a column circuit operates and consumes current in preparation for an output period, and a second state in which an output circuit consumes current to output a signal based on an optical signal. The image capturing device further includes a current consumption circuit configured to consume current such that a difference in the current consumption between the first state and the second state is reduced. According to the technology disclosed in Japanese Patent Laid-Open No. 2014-75620, with the current consumption circuit, variations in the potential of a current supply line which is caused by switching between the first state and the second state may be suppressed, and noise contained in an optical signal may be reduced.

In the image capturing device disclosed in Japanese Patent Laid-Open No. 2014-75620, the current consumption is the same between the first state and the second state. However, the technology disclosed in Japanese Patent Laid-Open No. 2014-75620 does not consider a standby period during which the plurality of column circuits and the output circuit are in a standby state. Moreover, a difference in the current consumption between the standby period during which the output circuit and the plurality of column circuits are in the standby state and the period in the first state is not considered.

The difference in the current consumption between the standby period during which the plurality of column circuits and the output circuit are in the standby state and the period in the first state causes variations in the potential of the current supply line. The variations in the potential of the current supply line reduces the S/N ratio of an optical signal.

SUMMARY OF THE INVENTION

A photoelectric conversion device according to an aspect of the present invention includes a plurality of photoelectric conversion units configured to generate optical signals by performing photoelectric conversion of incident light; a plurality of column circuits configured to sequentially output signals based on the optical signals by being scanned; an output circuit configured to sequentially receive the signals based on the optical signals; and a current consumption circuit configured to consume current. A sum of current consumptions per unit time of the plurality of column circuits in a first state in which the plurality of column circuits output the signals based on the optical signals is greater than a sum of current consumptions per unit time of the plurality of column circuits in a second state in which the plurality of column circuits do not output the signals based on the optical signals. A current consumption per unit time of the output circuit in a third state in which the output circuit outputs the signals based on the optical signals is greater than a current consumption per unit time of the output circuit in a fourth state in which the output circuit does not output the signals based on the optical signals. During a first period, the plurality of column circuits are in the first state, and the output circuit is in the fourth state. During a second period, the plurality of column circuits are in the second state, and the output circuit is in the fourth state. A sum of current consumptions per unit time of the plurality of column circuits and the output circuit during the first period is greater than a sum of current consumptions per unit time of the plurality of column circuits and the output circuit during the second period. The current consumption circuit consumes current such that a difference between the sum of current consumptions during the first period and the sum of current consumptions during the second period is reduced.

Further features of the present invention will become apparent from the following description of exemplary embodiments with reference to the attached drawings.

DESCRIPTION OF THE EMBODIMENTS

First Embodiment

A photoelectric conversion device according to a first embodiment will be described below with reference to drawings.

Figure 1:
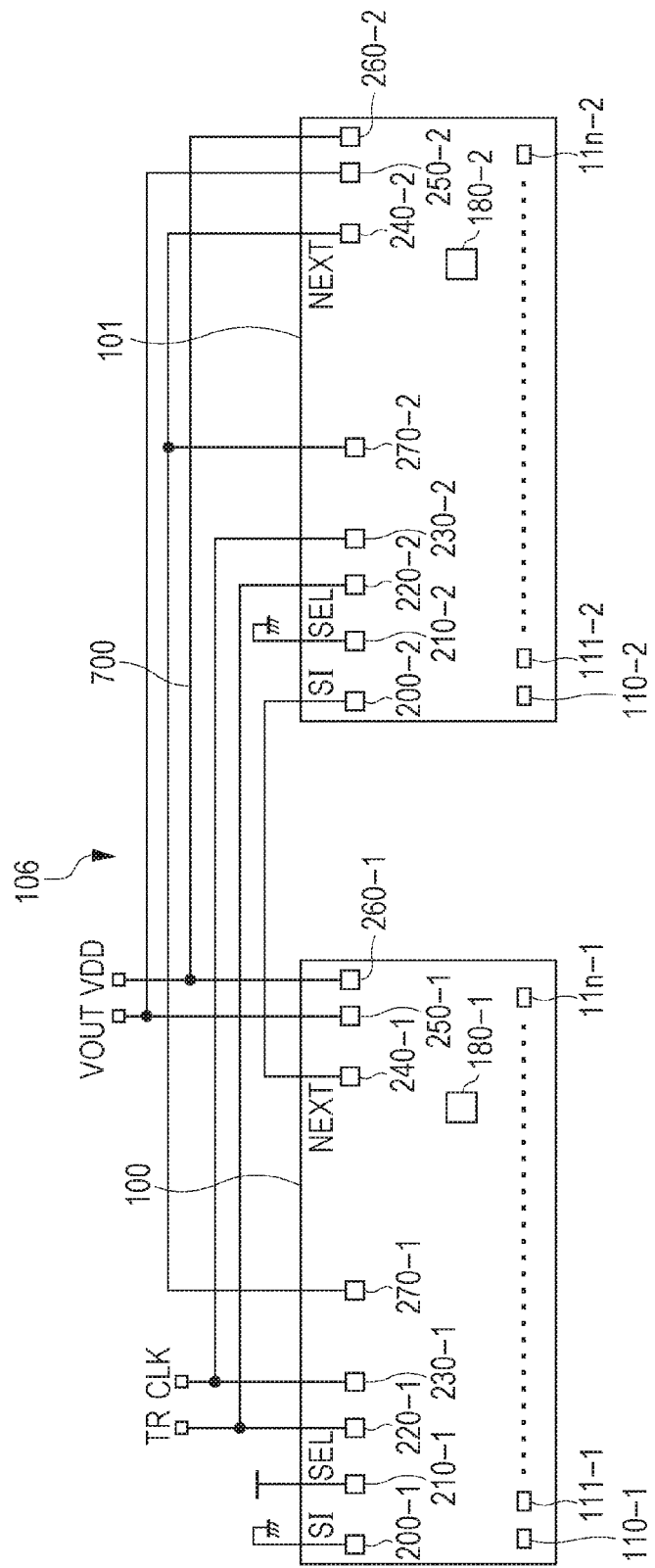
FIG. 1 is a diagram illustrating an example of a configuration of a photoelectric conversion device.

FIG. 1 is a schematic diagram of the photoelectric conversion device according to the first embodiment.

The photoelectric conversion device according to the first embodiment includes chips 100 and 101 which are mounted on a mounting substrate 106. Furthermore, the photoelectric conversion device according to the first embodiment is a multi-chip photoelectric conversion device which includes the chips 100 and 101 formed on different semiconductor substrates.

In FIG. 1, for members which have the same function between the chip 100 and the chip 101, a member of the chip 100 is referred to with a sign including a branch number "1" and a member of the chip 101 is referred to with a sign including a branch number "2".

The chips 100 and 101 each include pads 200, 210, 220, 230, 240, 250, 260, and 270.

The pad 200 is a pad (terminal) which receives scanning data of a shift register. The pad 210 is a pad (terminal) which receives a signal for selecting a chip. The pad 220 is a pad (terminal) which receives a start signal regarding a chip operation. The pad 230 is a pad (terminal) which receives a clock signal. The pad 240 is a pad (terminal) which outputs an END signal of a shift register. The pad 250 is a pad (terminal) which outputs a sensor signal. The pad 260 is a pad (terminal) which receives a power supply voltage. The pad 270 is a pad (terminal) which receives a start signal regarding a current consumption circuit.

The chips 100 and 101 each include pixels 110 to 11n. Furthermore, the chips 100 and 101 each include a current consumption circuit 180.

The pad 200 is not in use for the chip 100. A signal output from the pad 240-1 is applied to the pad 200-2, and a signal output from the pad 240-2 is applied to the pad 270.

The pad 210 is not in use for the chip 101. A non-use state of a pad represents a state in which a fixed voltage but a pulse signal is applied to the pad. A ground voltage is applied to the pads 200-1 and 210-2. A common current supply line 700 for supplying current based on a power supply voltage VDD is electrically connected to the chips 100 and 101. Accordingly, the common power supply voltage VDD is applied to the chips 100 and 101.

Figure 2:
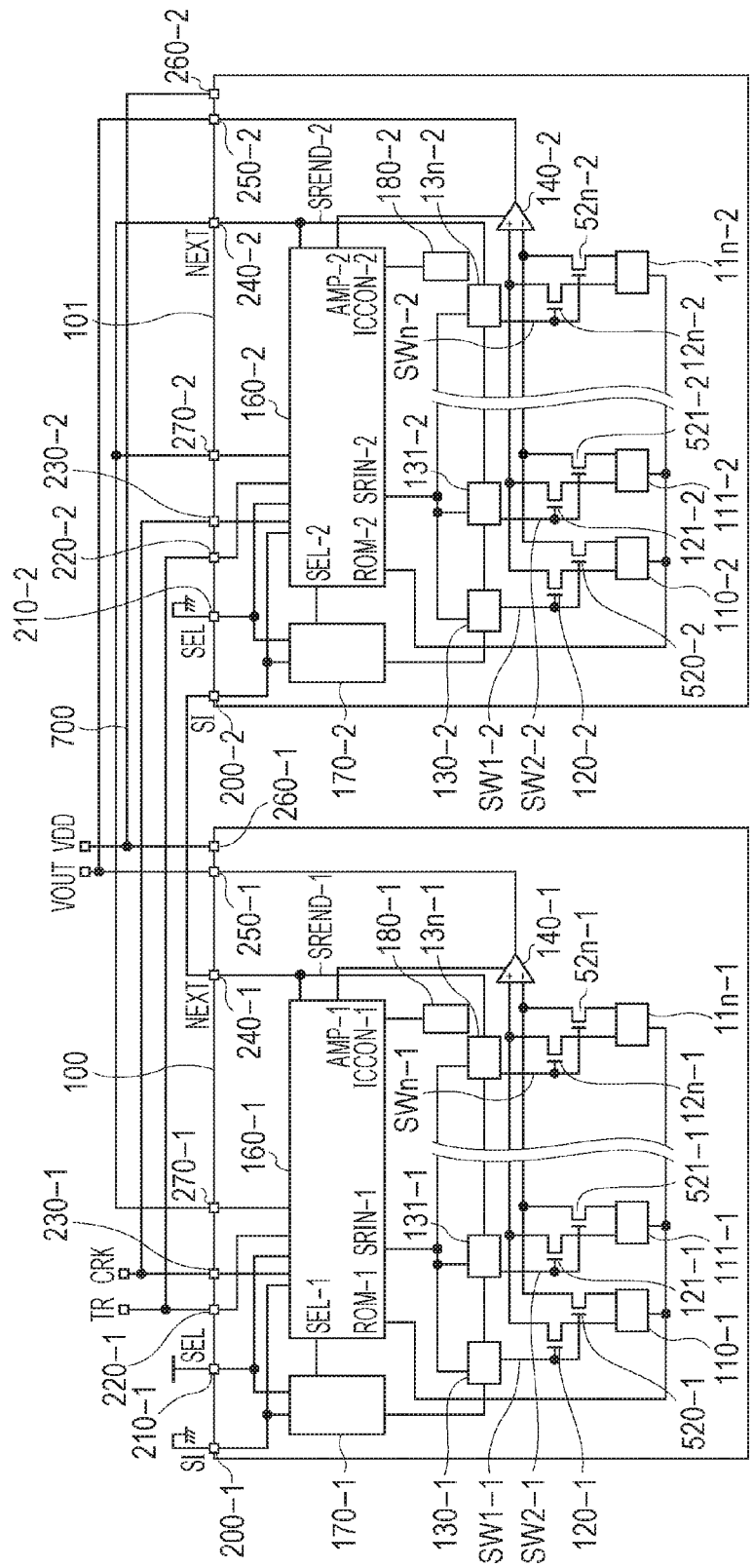
FIG. 2 is a diagram illustrating an example of a configuration of a photoelectric conversion device.

FIG. 2 is a diagram illustrating a circuit block configuration of the chips 100 and 101.

The chips 100 and 101 each include switches 120 to 12n and switches 520 to 52n. Furthermore, the chips 100 and 101 each include shift registers 130-1 to 13n-1 and an output amplifier 140. Moreover, the chips 100 and 101 each include a controller 160 and a chip selection circuit 170.

The current consumption circuit 180 operates based on a signal ICCON which is supplied from the controller 160.

The power supply voltage VDD is applied to the current consumption circuit 180.

The power supply voltage VDD may be applied via the pad 260 to the current consumption circuit 180 or may be applied via a pad different from the pad 260 to the current consumption circuit 180. That is, the current consumption circuit 180, and column circuits 150 and 151 and an output circuit, which will be described later, may be electrically connected in common to a power source which supplies the power supply voltage VDD and is provided outside the chip 100. As an example of this configuration, the current consumption circuit 180, the column circuits 150 and 151, and the output circuit are electrically connected in common to the current supply line 700.

In the chip 100, a signal SEL applied to the pad 210 is supplied to each of the controller 160 and the chip selection circuit 170.

A signal SEL-n is supplied from the controller 160 to the chip selection circuit 170. The signal SEL-n is a signal which is generated by the controller 160 based on the signal SEL.

The chip selection circuit 170 operates when either a signal SI input to the pad 200 or the signal SEL input to the pad 210 and the signal SEL-n supplied from the controller 160 reaches a High level (hereinafter, referred to as an H level).

Furthermore, a trigger signal TR supplied to the pad 220 and a clock signal CLK supplied to the pad 230 are supplied to the controller 160. A signal ROM is supplied from the controller 160 to the pixels 110 to 11n. The signal ROM represents signals supplied to the pixels 110 to 11n (described later).

A signal SRIN is supplied from the controller 160 to the shift registers 130 to 13n.

The shift registers 130 to 13n output to the switches 120 to 12n and the switches 520 to 52n signals SW1 to SWn which are generated based on the signal SRIN supplied from the controller 160, and sequentially drive the switches 120 to 12n and the switches 520 to 52n.

Figure 3:
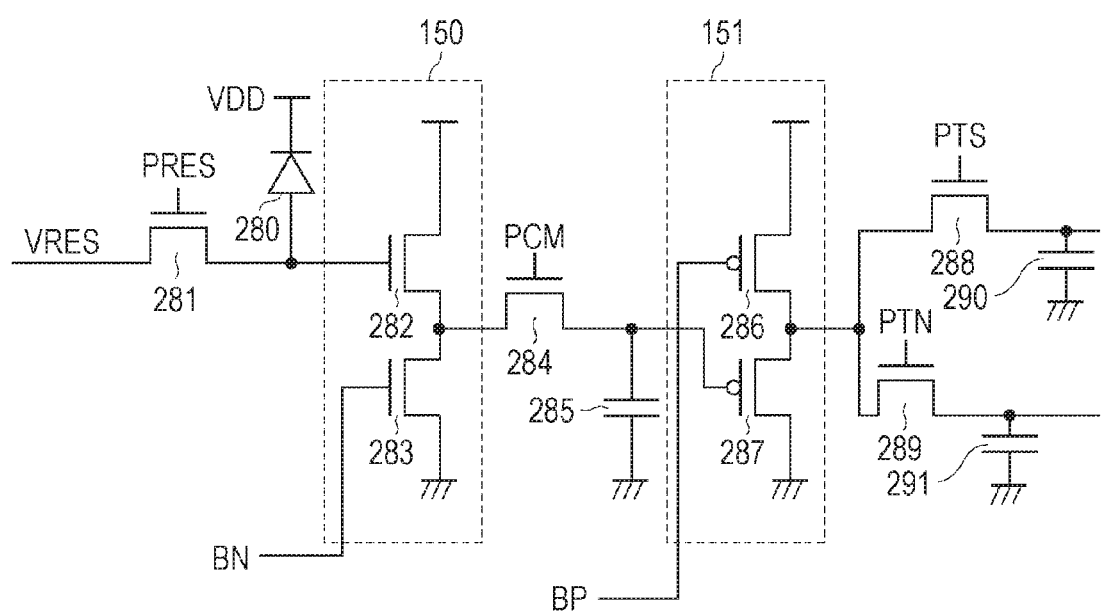
FIG. 3 is a diagram illustrating an example of a configuration of a pixel.

Accordingly, signals are sequentially output from the pixels 110 to 11n to the output amplifier 140. The pixels 110 to 11n each include the column circuits 150 and 151, as illustrated in FIG. 3 which will be described later. The output amplifier 140 is an output circuit to which signals are sequentially output from a plurality of column circuits which are provided in association with a plurality of photoelectric conversion units.

The output amplifier 140 includes a differential amplifier.

A signal AMP is supplied from the controller 160 to the output amplifier 140.

The output amplifier 140 outputs a signal to the pad 250, and a signal VOUT output from the output amplifier 140 is output through the pad 250.

The shift register 13n outputs a signal SREND to the controller 160 and the pad 240. A signal SREND-1 output from the pad 240-1 of the chip 100 is supplied to the pad 200-2 of the chip 101. A signal at a ground level is supplied in advance from the pad 210-2 to the chip selection circuit 170-2. When the signal SREND-1 at the H level is supplied to the pad 200-2, the shift registers 130 to 13n of the chip 101 sequentially generate the signals SW1 to SWn, and sequentially drive the switches 120 to 12n and the switches 520 to 52n. Accordingly, after the output amplifier 140-1 outputs signals based on optical signals of the pixels 110 to 11n of the chip 100, the output amplifier 140-2 outputs signals based on optical signals of the pixels 110-2 to 11n-2 of the chip 101.

The current consumption circuit 180 according to the first embodiment is provided as a circuit which is separate from the pixels 110 to 11n, a signal reading unit, and the controller 160.

FIG. 3 is a diagram illustrating a configuration of the pixel 110. The configuration of each of the pixels 111 to 11n is the same as the configuration of the pixel 110.

The pixel 110 includes a photoelectric conversion element 280, metal-oxide semiconductor (MOS) transistors 281, 282, 283, 284, 286, 287, 288, and 289 and capacitive elements 285, 290, and 291. The signal ROM includes a signal PTS, a signal PTN, a signal PCM, a signal PRES, a bias signal BP, and a bias signal BN. Based on the bias signal BN, the MOS transistor 283 operates as a current source, and forms a column circuit (source follower circuit) 150 together with the MOS transistor 282. Furthermore, based on the bias signal BP, the MOS transistor 286 operates as a current source, and forms a column circuit (source follower circuit) together with the MOS transistor 287. The voltage VRES is a reset voltage of the photoelectric conversion element 280.

Next, operations of the chips 100 and 101 will be described with reference to FIG. 4.

At time t1, the trigger signal TR turns to the H level. Thus, the controllers 160 of the chips 100 and 101 supply the signals ROM-1 and ROM-2 to the pixels 110 to 11n of the chips 100 and 101, and allow a preparing operation for outputting a photoelectric conversion signal based on incident light to be performed. Then, the trigger signal TR is set to a LOW level (hereinafter, referred to as an L level). Furthermore, by setting the signals ROM-1 and ROM-2 to the H level, the column circuits 150 and 151 provided in each of the chips 100 and 101 perform a signal reading operation.

A first period in the first embodiment indicates a blanking period. That is, a period during which the column circuits 1501 and 151 operate and the output amplifier 140-1 does not operate corresponds to the first period in the first embodiment. Furthermore, a state in which the column circuits 150 and 151 operate (state in which a signal based on an optical signal is output) corresponds to a first state. A state in which the column circuits 150 and 151 do not operate corresponds to a second state. A state in which the output amplifier 140 operates (the output amplifier 140 outputs a signal based on an optical signal output from the column circuits 150 and 151) corresponds to a third state. A state in which the output amplifier 140 does not operate corresponds to a fourth state.

At time t2, the signal SEL-1 turns to the H level. Accordingly, signals at the H level are supplied to the shift registers 130-1, 131-1, and 13n-1.

Furthermore, a signal AMP-1 turns to the H level at time t2. Accordingly, the output amplifier 140-1 enters an operating state. Furthermore, the controller 160-1 starts to generate a signal SRIN-1 which is synchronized with the clock signal CLK. The period from time t1 to a time immediately before time t2 is called a blanking period.

At time t3, the shift register 130-1 sets the signal SW-1 to the H level, based on the signal SRIN-1. Accordingly, a signal generated by the pixel 110-1 is output to the outside of the chip via the output amplifier 140-1 and the pad 250-1.

Then, based on the signal SRIN-1, the shift registers 131-1 to 13n-1 sequentially set the signals SW2-1 to SWn-1 to the H level. Accordingly, signals of the pixels 111-1 to 11n-1 are sequentially output from the output amplifier 140-1 to the outside of the chip 100 via the pad 250-1.

A period from time t3 to time t4 is called an output period 1.

The output period 1 is a period during which the chip 100 outputs a signal VOUT.

At time t4, the shift register 13n-1 sets the signal SREND-1 to the H level. Accordingly, the controller 160-2 of the chip 101 sets a signal AMP-2 to the H level, and the output amplifier 140-2 enters the operating state. Furthermore, the controller 160-2 starts to generate a signal SRIN-2 which is synchronized with the clock signal CLK. After time t5, in the chip 101, as in the operation of the chip 100 described above, the shift registers 130-2, 131-2, and 13n-2 set the signals SW1-2, SW2-2, and SW3-2 to the H level, based on the signal AMP-2. Accordingly, the output amplifier 140-2 sequentially outputs the signals of the pixels 110-2, 111-2, and 11n-2 to the outside of the chip via the pad 250-2.

A period from time t5 to time t6 is called an output period 2. The output period 2 is a period during which the chip 101 outputs a signal VOUT.

A third period in the first embodiment corresponds to a period including both the output period 1 and the output period 2. That is, the third period corresponds to a period during which the column circuits 150 and 151 do not operate and the output amplifier 140 operates. A second period will be described later.

At time t6, the shift register 13n-2 sets a signal SREND-2 to the H level.

When the signal SREND-2 at the H level is supplied to the pad 270, signals ICCON-1 and the ICCON-2 turn to the H level.

Accordingly, the current consumption circuit 180 which is provided in each of the chips 100 and 101 performs an operation. During the next blanking period, that is, at time t7 at which the column circuits 150 and 151 operate, the signals ICCON-1 and ICCON-2 are set to the L level, and the current consumption circuit 180 enters a non-operating state. That is, the current consumption circuit 180 operates during a period from time t6 to time t7.

The second period in the first embodiment corresponds to a standby period. That is, the second period corresponds to a period during which all of the column circuits 150 and 151 and the output amplifier 140 do not operate. The current consumption circuit 180 operates during the second period, and the current consumption circuit 180 does not operate in the first state and the second state. The blanking period which corresponds to the first period is started immediately after the second period, which is the standby period.

Next, an operation of the current consumption circuit 180 according to the first embodiment will further be described below.

Figure 4:
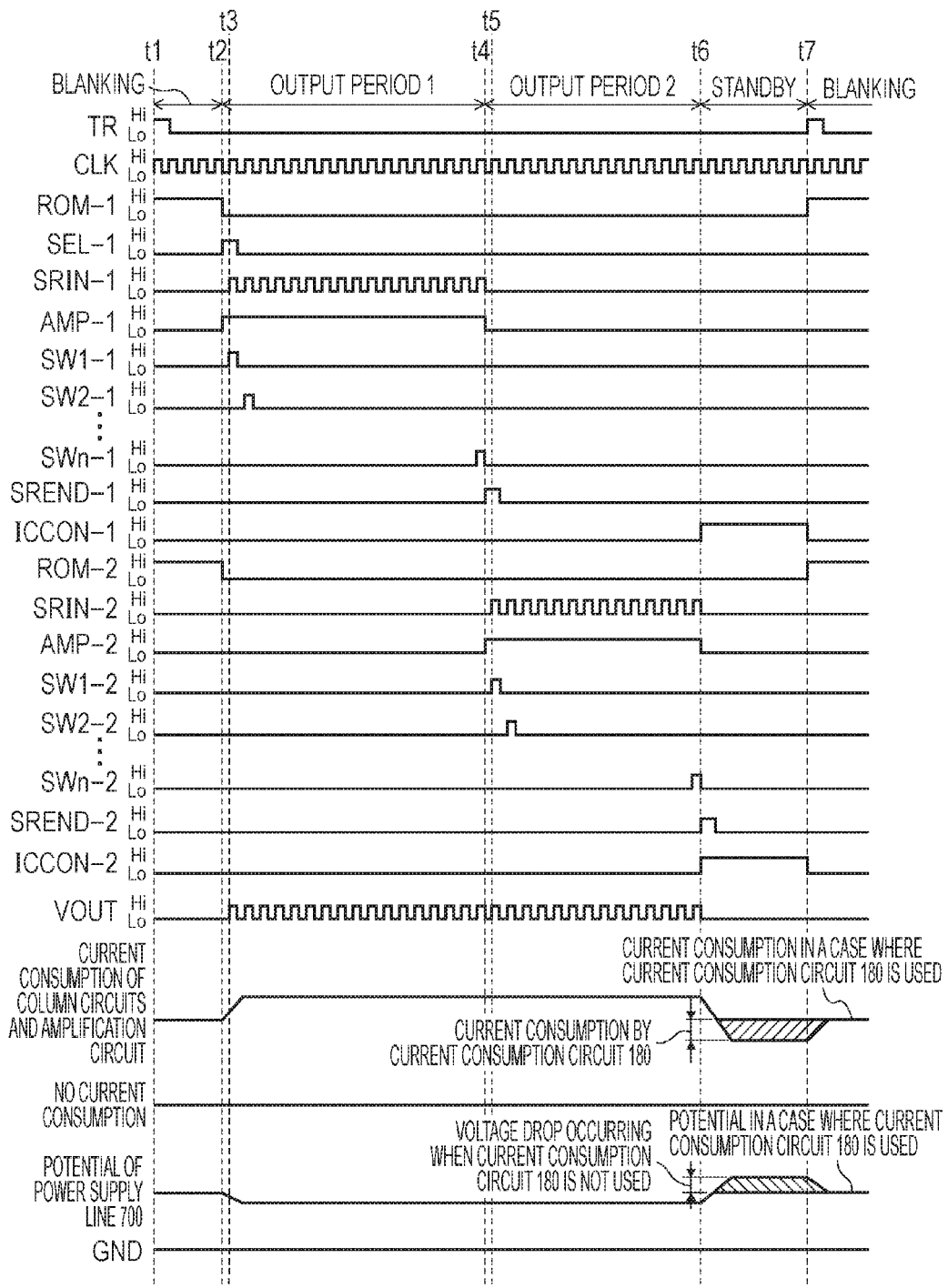
FIG. 4 is a diagram illustrating an example of an operation of a photoelectric conversion device.

FIG. 4 illustrates the current consumption by the column circuits 150 and 151 and the output amplifier 140 and the potential of the current supply line 700 which is connected in common to the column circuits 150 and 151 and the output amplifier 140. Hereinafter, unless otherwise stated, a current consumption represents a current consumption per unit time.

The current consumption and the power supply voltage VDD of the column circuits 150 and 151 and the output amplifier 140 of a photoelectric conversion device which does not include the current consumption circuit 180 are expressed by oblique lines. During the standby period, none of the column circuits 150 and 151 and the 140 operate. Therefore, the current consumption by the column circuits 150 and 151 and the output amplifier 140 during the standby period is smaller than the current consumption during the blanking period.

At transition from the standby period to the blanking period, the current consumption by the column circuits 150 and 151 increases. In accordance with variations in the current consumption, the potential of the current supply line 700 which supplies current based on the power supply voltage VDD varies.

In the case where the column circuits 150 and 151 read a signal during a period in which the potential of the current supply line 700 varies, noise caused by variations in the potential of the current supply line 700 is superimposed on the signal. Therefore, a signal which is output later from the output amplifier 140 contains the noise caused by the variations in the potential of the current supply line 700. Accordingly, the variations in the potential of the current supply line 700 reduce the accuracy of a signal output from the output amplifier 140.

A reduction in the accuracy of an output signal caused by variations in the potential of the current supply line 700 will further be explained by describing an operation of the pixels 110 to 11n.

Figure 5:
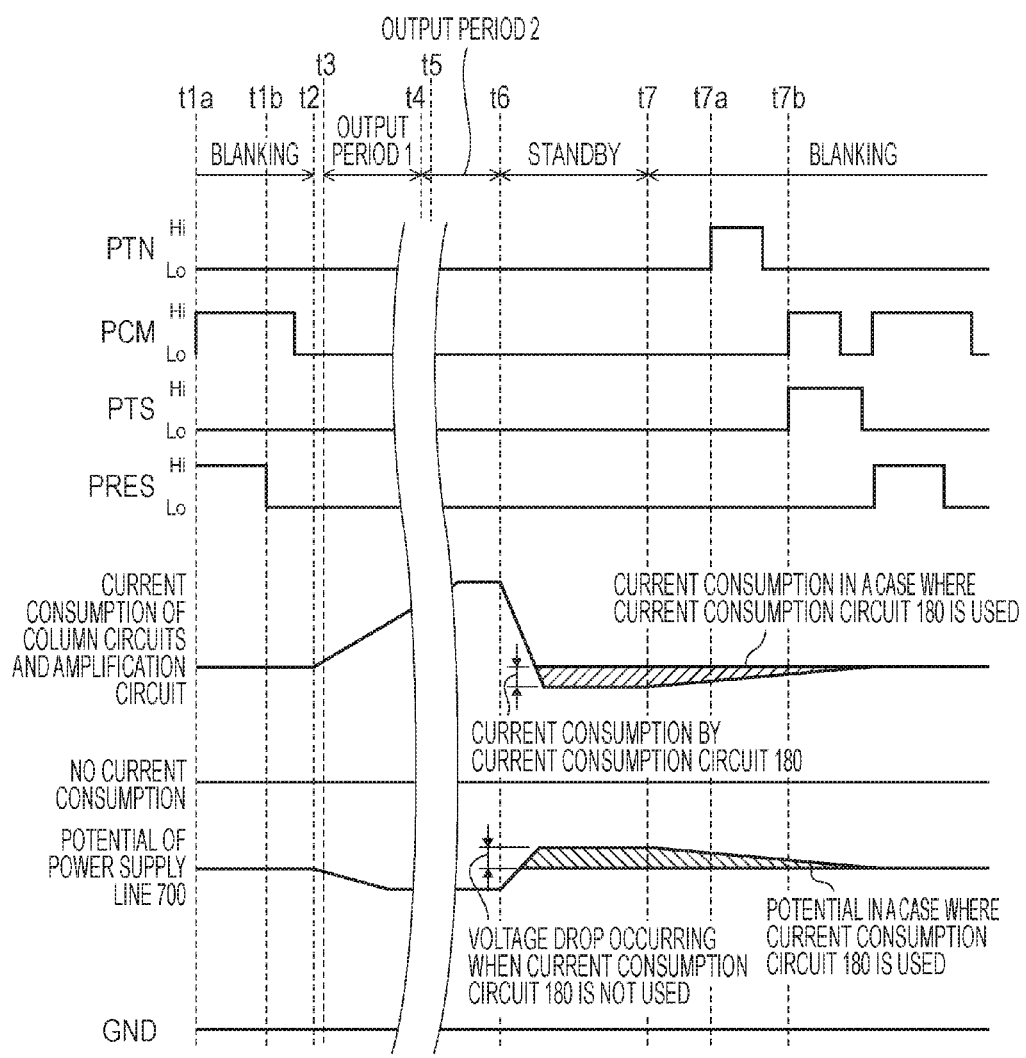
FIG. 5 is a diagram illustrating an example of an operation of a photoelectric conversion device.

FIG. 5 is a timing chart for explaining an operation of the pixels 110 to 11n and the current supply line 700 during the blanking period. Signals illustrated in FIG. 5 correspond to signals illustrated in FIG. 3. Furthermore, times t2, t3, t4, t5, t6, and t7 illustrated in FIG. 3 correspond to times illustrated in FIG. 5.

At time t1a which is after time t1 of FIG. 3, a signal PRES turns to the H level, and the MOS transistor 281 is thus turned on. Accordingly the photoelectric conversion element 280 is reset to the voltage VRES.

Furthermore, at time t1a, a signal PCM turns to the H level. Accordingly, the capacitive element 285 performs sampling of output of the MOS transistor 282.

Then, the signal PRES turns to the L level at time t1b, and the MOS transistor 281 is thus turned off. At this time, reset noise is held in the photoelectric conversion element 280.

The signal PCM is maintained at the H level also at time t1b, and the capacitive element 285 performs sampling of a noise signal corresponding to the reset noise. Then, the signal PCM turns to the L level, and the MOS transistor 284 is thus turned off. Accordingly, the noise signal is held in the capacitive element 285.

During the period from time t3 to time t6, which is an output period after that, all of the signals PTN, PCM, PTS, and PRES are at the L level. During this output period, an optical signal held in the capacitive element 290 and a noise signal held in the capacitive element 291 are output in a frame prior to time t1a.

Meanwhile, during this output period, a photocurrent is generated in the photoelectric conversion element 280, and an optical signal obtained by superimposing the reset noise on a signal based on the photocurrent is held in the photoelectric conversion element 280.

At time t7a, the signal PTN turns to the H level. Accordingly, the noise signal held in the capacitive element 285 is held in the capacitive element 291.

At time t7b, the signal PCM and the signal PTS turn to the H level. Since the signals PCM and PTS are at the H level, an optical signal output from the MOS transistor 282 is output to the capacitive element 290. When the signal PTS turns to the L level, the capacitive element 290 holds the optical signal.

The subsequent operations are the same as operations at time t1a and later. Therefore, explanation for those operations will be omitted.

The current consumption circuit 180 operates during the period from time t6 to time t7. At time t7, at which the blanking period starts, a noise signal output from the MOS transistor 282 is held in the capacitive element 285. Furthermore, the photoelectric conversion element 280 holds an optical signal.

First, a case where the photoelectric conversion device according to the first embodiment does not include the current consumption circuit 180 will be described. As described above, variations in the potential of the current supply line 700 reduce the accuracy of an output signal. The reduction in the accuracy of an output signal may not be suppressed even if a difference is produced between an optical signal and a noise signal. That is, in the case where there is a difference in the potential of the current supply line 700 between time t7a at which the signal PTN is at the H level and time t7b at which the signal PTS is at the H level, a difference occurs in the amount of signal variation caused by variations in the potential of the current supply line 700 between the noise signal at the capacitive element 291 and the optical signal at the capacitive element 290. Therefore, even if the noise signal is deducted from the optical signal, noise caused by the variations in the potential of the current supply line 700 may not be deducted.

In contrast, in the first embodiment, the current consumption circuit 180 consumes current during the standby period, which is the period from time t6 to time t7, so that the difference in the current consumption by the column circuits 150 and 151 and the output amplifier 140 between the standby period and the blanking period may be reduced.

Accordingly, the photoelectric conversion device according to the first embodiment reduces variations in the current consumption by the column circuits 150 and 151 and the output amplifier 140 between the standby period and the blanking period. Accordingly, variations in the potential of the current supply line 700 may be reduced. Therefore, an output signal output from the output amplifier 140 may be less likely to contain noise caused by variations in the potential of the current supply line 700. Furthermore, the photoelectric conversion device according to the first embodiment may be less likely to generate a difference in the amount of signal variation caused by variations in the potential of the current supply line 700 between an optical signal and a noise signal. Therefore, a signal obtained by deducting the noise signal from the optical signal is less likely to contain noise caused by variations in the potential of the current supply line 700.

In one embodiment, the current consumption circuit 180 of the photoelectric conversion device according to the first embodiment consumes the same amount of current between the standby period and the blanking period.

Figure 6:
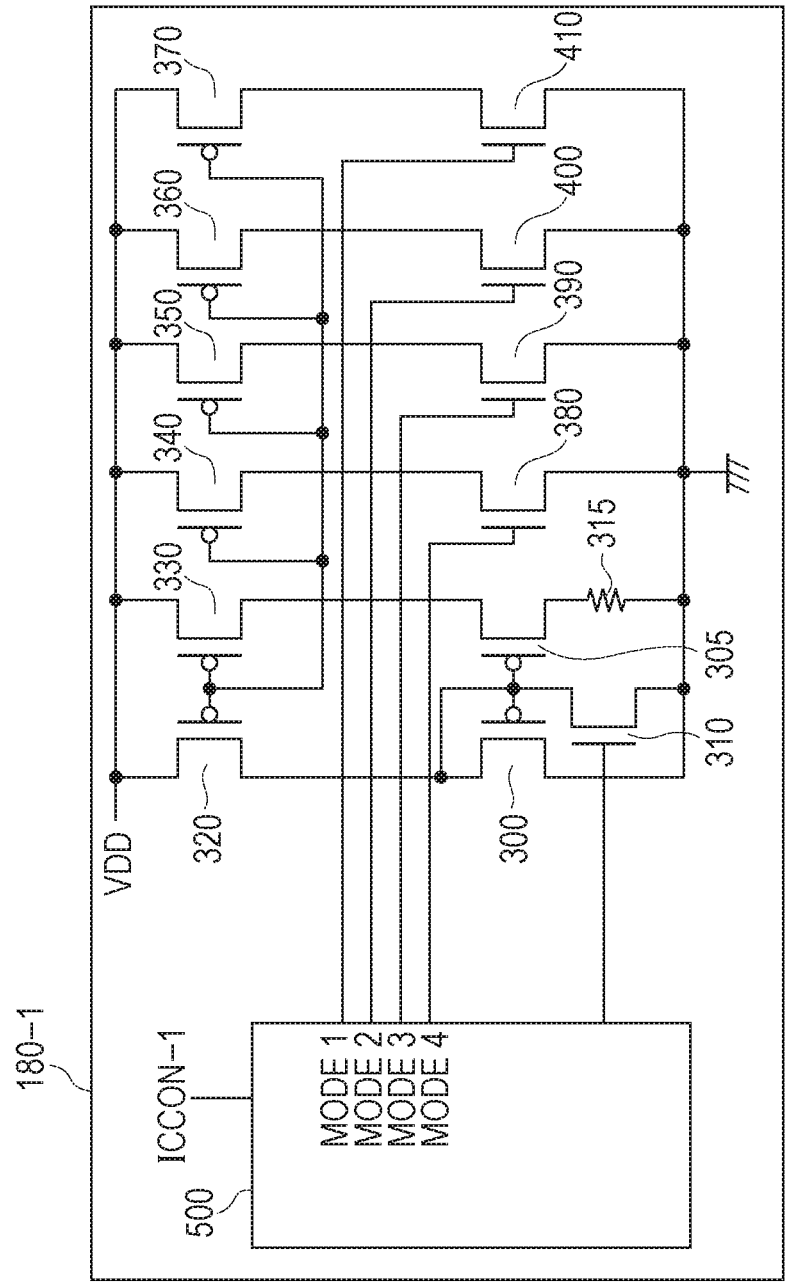
FIG. 6 is a diagram illustrating an example of an operation of a photoelectric conversion device.

FIG. 6 is a diagram illustrating an equivalent circuit of an example of the current consumption circuit 180 according to the first embodiment.

The current consumption circuit 180 includes MOS transistors 300, 305, 310, 320, 330, 340, 350, 360, 370, 380, 390, 400, and 410 and a resistive element 315. The current consumption circuit 180 further includes a current consumption controller 500. A signal ICCON-1 is supplied from the controller 160 to the current consumption controller 500.

When the signal ICCON-1 at the H level is supplied from the controller 160 to the current consumption controller 500, the current consumption controller 500 outputs signals MODE1, MODE2, MODE3, MODE4, and MODE5 for controlling ON/OFF of the MOS transistors 310, 380, 390, 400, and 410.

Next, the current consumption by the current consumption circuit 180 illustrated in FIG. 6 will be described below. First, a drain current of a MOS transistor is represented by equation (1).

$$I_d = \frac{\beta}{2}(V_{gs} - V_{th})^2 \quad (1)$$

In equation (1), $V_{gs}$ represents a voltage between the gate and source of the MOS transistor, and $V_{th}$ represents a threshold voltage of the MOS transistor. Furthermore, $\beta$ is expressed by equation (2).

$$\beta = \mu_0 C_{ox} \frac{W}{L} \quad (2)$$

In equation (2), $\mu_0$ represents the mobility of a carrier, $C_{ox}$ represents a gate capacity per unit area of the MOS transistor, W represents the gate width of the MOS transistor, and L represents the gate length of the MOS transistor.

In FIG. 6, the voltage between the gate and source of the MOS transistor 300 is represented by $V_{gs1}$, the voltage between the gate and source of the MOS transistor 305 is represented by $V_{gs2}$, and the resistance value of the resistive element 315 is represented by R. A drain current Id of the MOS transistor 305 is represented by $(V_{gs1}-V_{gs2})/R$. Furthermore, let the gate width and the gate length be the same between the MOS transistor 320 and the MOS transistor 330, the drain current of the MOS transistor 300 is also represented by $(V_{gs1}-V_{gs2})/R$. When $V_{gs1}$ and $V_{gs2}$ are deleted from equation (1), equation (3) is obtained.

$$I_d = \frac{\sqrt{\frac{2I_d}{\beta_1}} - \sqrt{\frac{2I_d}{\beta_2}}}{R} \qquad (3)$$

In equation (3), $\beta_1$ represents $\beta$ of the MOS transistor 300, and $\beta_2$ represents $\beta$ of the MOS transistor 305. By using equation (3), the drain current Id of the MOS transistors 300 and 305 is determined based on the gate width and gate length of the MOS transistors 300 and 305 and the resistance value of the resistive element 315. On the assumption that the MOS transistor 310 is OFF and the MOS transistors 380, 390, 400, and 410 are ON, if the gate width and the gate length of the MOS transistors 340, 350, 360, and 370 are equal to those of the MOS transistors 320 and 330, the current consumption by the current consumption circuit 180 is about 6×Id. In contrast, on the assumption that the MOS transistor 310 is ON, the gate potential of the MOS transistors 300 and 305 decreases to the ground potential. Therefore, the current consumption by the current consumption circuit 180 is about zero.

Accordingly, during the standby period, the MOS transistor 310 is set to OFF, and the MOS transistors 380, 390, 400, and 410 are set to ON in accordance with a current consumption.

During periods other than the standby period, the MOS transistor 310 is set to ON and the MOS transistors 380, 390, 400, and 410 are set to ON in accordance with a current consumption.

Accordingly, variations in the current consumption by the column circuits 150 and 151 and the output amplifier 140 at transition from the standby period to the blanking period may be reduced, and variations in the voltage of the current supply line 700 may be suppressed. Therefore, the S/N ratio of an output signal may be improved.

In the current consumption circuit 180 according to the first embodiment, by changing the number of transistors of the MOS transistors 380, 390, 400, and 410 that are set to ON, the current consumption by the current consumption circuit 180 may be varied.

For the number of transistors that are set to ON, current consumption setting data may be input in advance to the current consumption controller 500 from the outside of the chips 100 and 101.

In the case where the current consumption setting data is input from the outside of the chips 100 and 101, for example, the current consumption setting data may be input to the pad 220 to which the trigger signal TR in FIG. 1 is applied.

Accordingly, the current consumption by the current consumption circuit 180 may be set without increasing the number of pads.

In one embodiment, the current consumption circuit 180 is provided outside a pixel array in which the pixels 110 to 11n are arranged. In the case where the current consumption circuit 180 is provided within the pixel array, when the current consumption circuit 180 consumes current during the standby period, dark current generated at the photoelectric conversion element 280 increases. Furthermore, light emission generated when the current consumption circuit 180 consumes current during the standby period may be incident to the photoelectric conversion element 280. By providing the current consumption circuit 180 outside the pixel array so that the current consumption circuit 180 is kept away from the pixels 110 to 11n, influence received at the photoelectric conversion element 280 by the dark current and the light emission may be reduced.

In the first embodiment, a configuration in which a shift register is used as an example of a scanning circuit has been described. However, an embodiment is not limited to the above configuration. For example, a scanning circuit may be a decoder.

As described above, the photoelectric conversion device according to the first embodiment includes the current consumption circuit 180. The current consumption circuit 180 consumes current such that a difference between the sum of the current consumptions of the column circuits 150 and 151 and the output amplifier 140 during the standby period and the sum of the current consumptions of the column circuits 150 and 151 and the output amplifier 140 during the blanking period may be reduced. Accordingly, variations in the potential of the current supply line 700 caused by the difference in the current consumption generated between the standby period and the blanking period may be reduced. Therefore, noise which is caused by the variations in the potential of the current supply line 700 may be less likely to be contained in an output signal.

Furthermore, a configuration in which one column circuit is arranged in association with one photoelectric conversion unit has been described as an example in the first embodiment. As another example, one column circuit may be arranged in association with a plurality of photoelectric conversion units or a plurality of column circuits may be arranged in association with one photoelectric conversion unit. The above configuration may also be included in a configuration in which a plurality of column circuits are arranged in association with a plurality of photoelectric conversion units.

Second Embodiment

In a second embodiment, the current consumption circuit 180 having a circuit configuration which is different from that of the current consumption circuit 180 described above in the first embodiment will be described.

Figure 7:
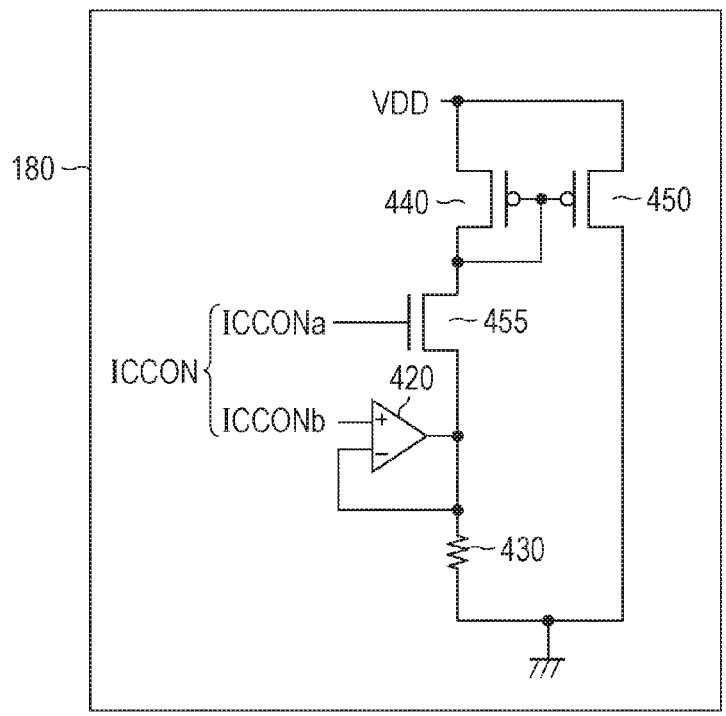
FIG. 7 is a diagram illustrating an example of a configuration of a current consumption circuit.

FIG. 7 is a diagram illustrating an equivalent circuit of the current consumption circuit 180 according to the second embodiment.

The current consumption circuit 180 illustrated in FIG. 7 includes a resistive element 430 and MOS transistors 440, 450, and 455, and an operation amplifier 420.

A signal ICCON includes a signal ICCONa for performing ON/OFF control of the MOS transistor 455 and a bias signal ICCONb.

The potential of the bias signal ICCONb is represented by VREF, the resistance value of the resistive element 430 is represented by R, and the gate width and the gate length are the same between the MOS transistor 440 and the MOS transistor 450.

In the case where the MOS transistor 455 is ON, the current consumption by the current consumption circuit 180 is represented by approximately (2×VREF)/R. In contrast, when the MOS transistor 455 is OFF, the current consumption by the current consumption circuit 180 is approximately zero.

As described above, the current consumption by the current consumption circuit 180 may be made different between the standby period and the blanking period.

Furthermore, by changing the value of the potential VREF of the bias signal ICCONb from the outside of the chips 100 and 101, the current consumption by the current consumption circuit 180 may be varied.

Figure 8:
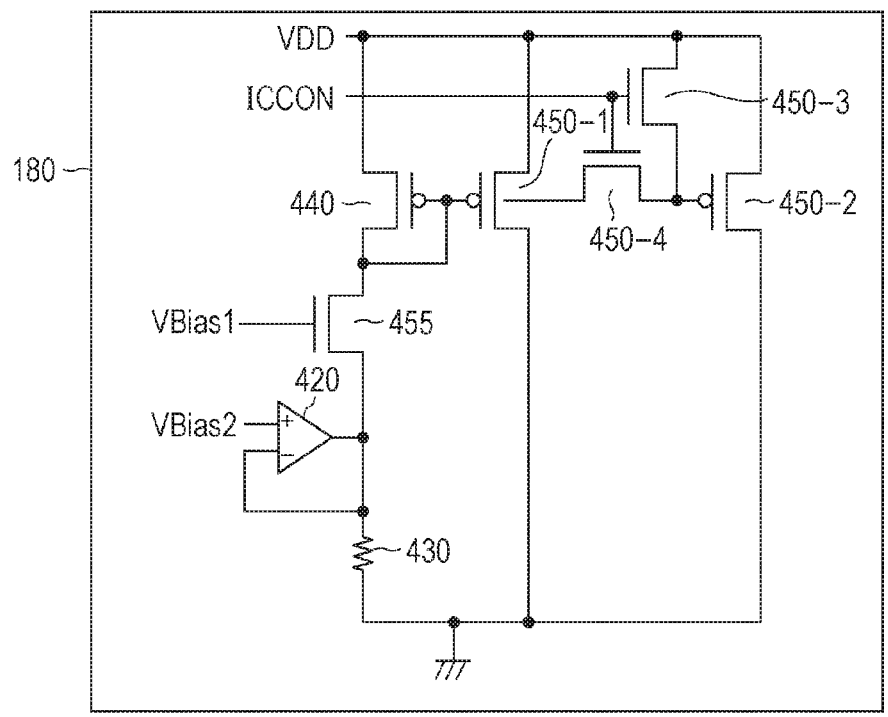
FIG. 8 is diagram illustrating an example of a configuration of a current consumption circuit.

FIG. 8 is a diagram illustrating an example of a different circuit configuration of the current consumption circuit 180.

In the current consumption circuit 180 illustrated in FIG. 8, a voltage VBias1 is applied to the MOS transistor 455, and the MOS transistor 455 is set to ON.

As the voltage VBias1, a potential which allows the MOS transistor 455 to be ON may be input from the outside.

Furthermore, a voltage VBias2 is applied to a non-inversion input terminal of the operation amplifier 420. The current consumption circuit 180 also includes a MOS transistor 450-1, instead of the MOS transistor 450.

Moreover, the current consumption circuit 180 includes MOS transistors 450-2, 450-3, and 450-4. The MOS transistors 450-3 and 450-4 are turned ON when the signal ICCON turns to the H level.

In the current consumption circuit 180, when the signal ICCON is at the H level, the MOS transistor 450-2 is turned on. Accordingly, the current consumption by the current consumption circuit 180 is greater than the case where the signal ICCON is at the L level. In the current consumption circuit 180 according to the second embodiment, the bias signal ICCONb illustrated in FIG. 7 and the voltage VBias2 illustrated in FIG. 8 may be input directly from the outside of the chip.

The bias ICCONb in FIG. 7 and the voltage VBias2 in FIG. 8 exhibit not discrete but continuous voltage values. Therefore, compared to the case where the current consumption by the current consumption circuit 180 is controlled through the controller 160 in the first embodiment, fine control of the current consumption by the current consumption circuit 180 may be achieved in the second embodiment.

Third Embodiment

In a third embodiment, the operating period of the current consumption circuit 180 is shorter than the photoelectric conversion device according to the first embodiment.

Next, a photoelectric conversion device according to the third embodiment will be described below by focusing on differences from the first embodiment.

Figure 9:
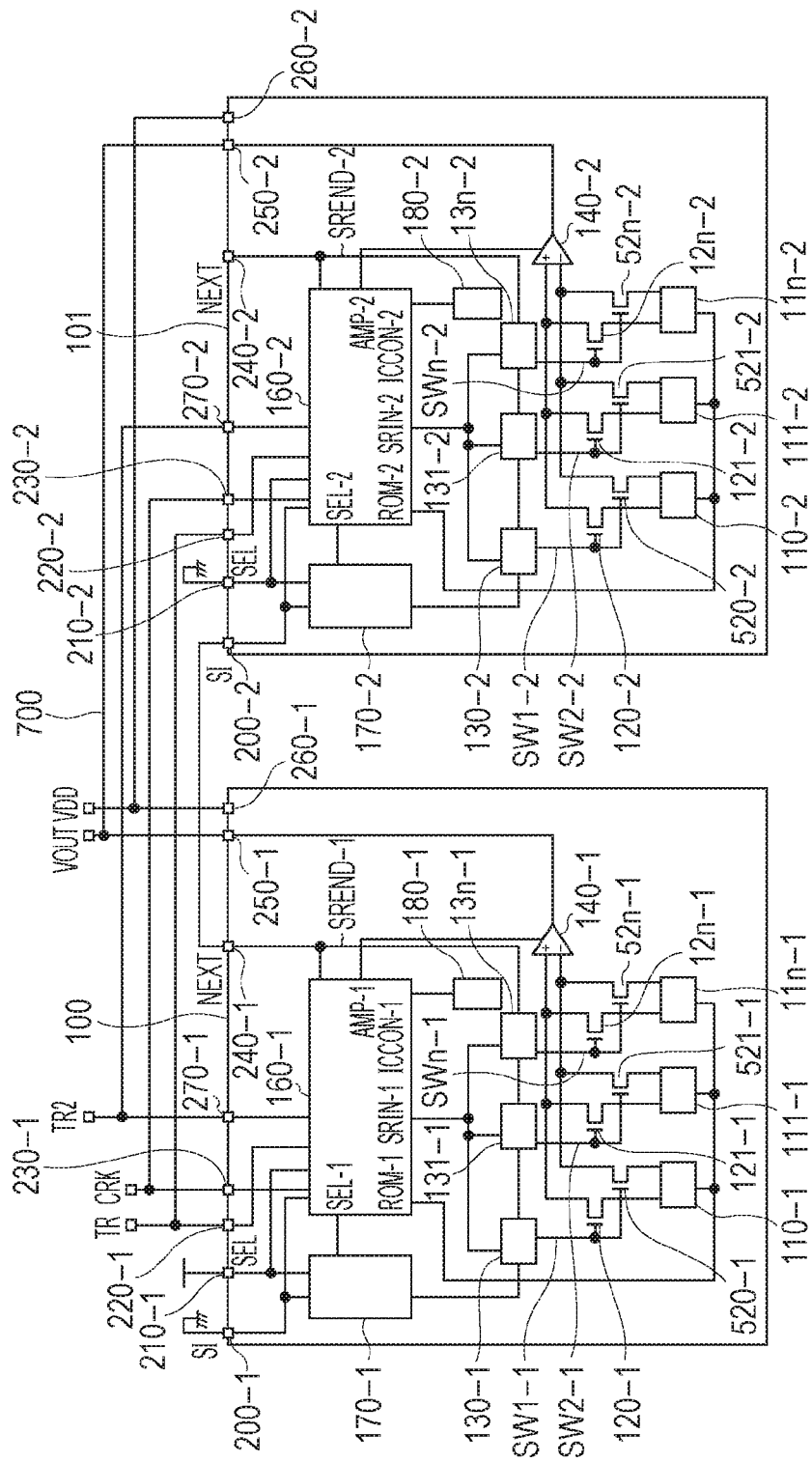
FIG. 9 is a diagram illustrating an example of a configuration of a photoelectric conversion device.

FIG. 9 illustrates the photoelectric conversion device according to the third embodiment. In FIG. 9, members which have the same functions as those in FIG. 2 will be referred to with the same reference signs as those in FIG. 2.

In the photoelectric conversion device according to the third embodiment, a signal for controlling the current consumption circuit 180 is supplied from the outside of a chip through the pad 270. Functions of the pad 270 are the same as those in FIG. 1.

Figure 10:
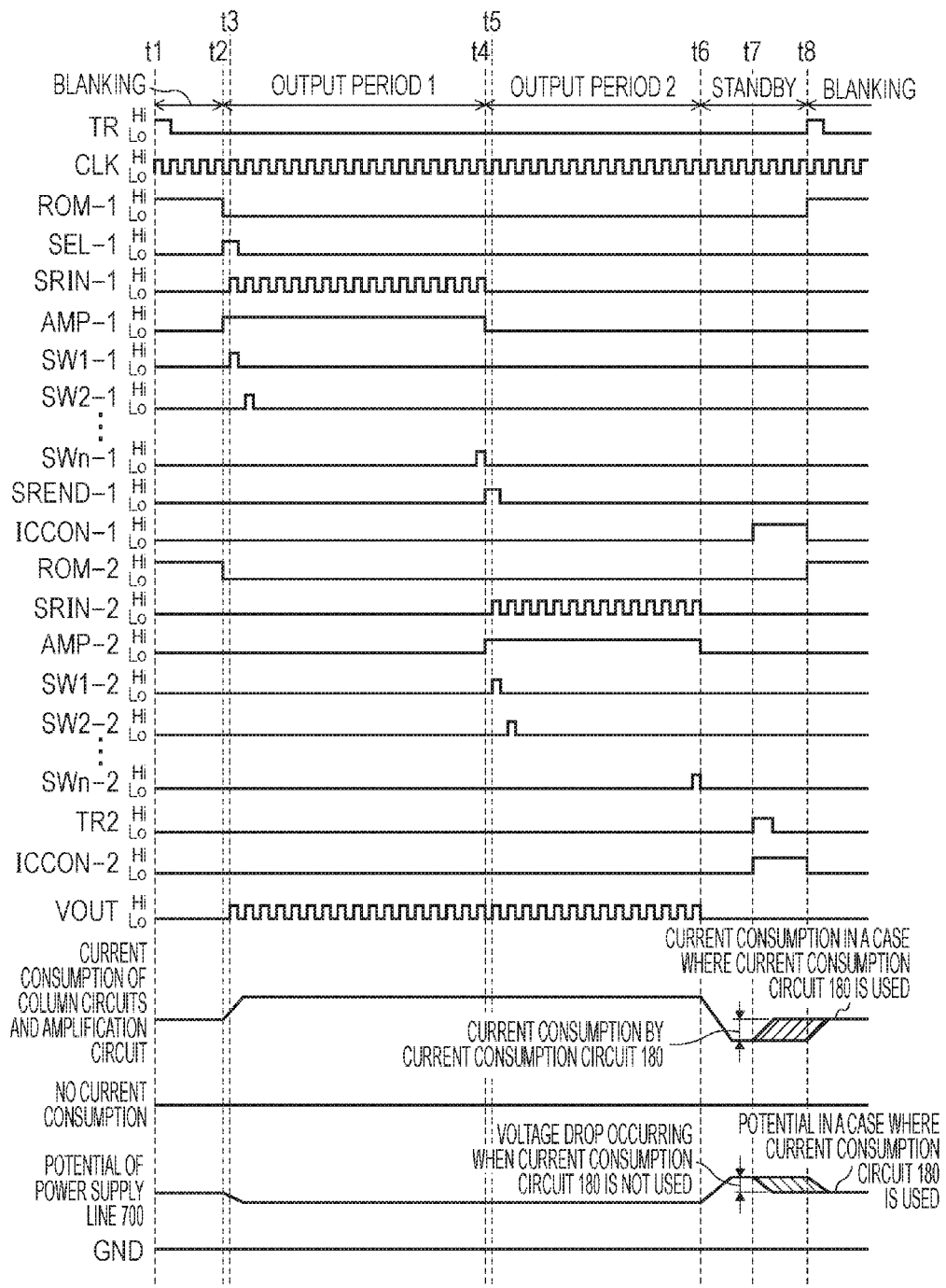
FIG. 10 is a diagram illustrating an example of an operation of a photoelectric conversion device.

FIG. 10 is a timing chart illustrating an operation of the photoelectric conversion device according to the third embodiment.

The timing chart illustrated in FIG. 10 is different from the timing chart illustrated in FIG. 4 in that a signal as a start signal for the signal ICCON for driving the current consumption circuit is supplied as a signal TR2 from the outside to the pad 270. When the signal TR2 at the H level is supplied to the pad 270 at time t7, the signals ICCON-1 and ICCON-2 turn to the H level.

Furthermore, by inputting current consumption setting data to the pad 270 in advance, a signal for starting an operation of the current consumption circuit 180 and the current consumption setting data are serially supplied.

Accordingly, the current consumption circuit 180 which is provided in each of the chips 100 and 101 performs an operation, and consumes current. At a start time of the next blanking period, that is, at time t8 at which the column circuits 150 and 151 operate, the signals ICCON-1 and ICCON-2 are set to the L level, and the current consumption circuit 180 is set to a non-operating state.

Therefore, the current consumption circuit 180 does not operate at the start time of the standby period, which is the second period, and starts to operate within the standby period. In the photoelectric conversion device according to the first embodiment, the current consumption circuit 180 operates throughout the standby period. Compared to the photoelectric conversion device according to the first embodiment, the photoelectric conversion device according to the third embodiment may reduce power consumption.

The current consumption setting data may be input to the pad 220 in advance, as in the second embodiment.

Fourth Embodiment

A photoelectric conversion device according to a fourth embodiment is different from the photoelectric conversion device according to the first embodiment in which the current consumptions of the column circuits 150 and 151 and the output amplifier 140 are the same among the standby period, the blanking period, and the output period.

Next, the photoelectric conversion device according to the fourth embodiment will be described below with reference to drawings by focusing on differences from the first embodiment.

The configuration of the photoelectric conversion device is the same as the configuration illustrated in FIG. 2 explained in the first embodiment.

Figure 11:
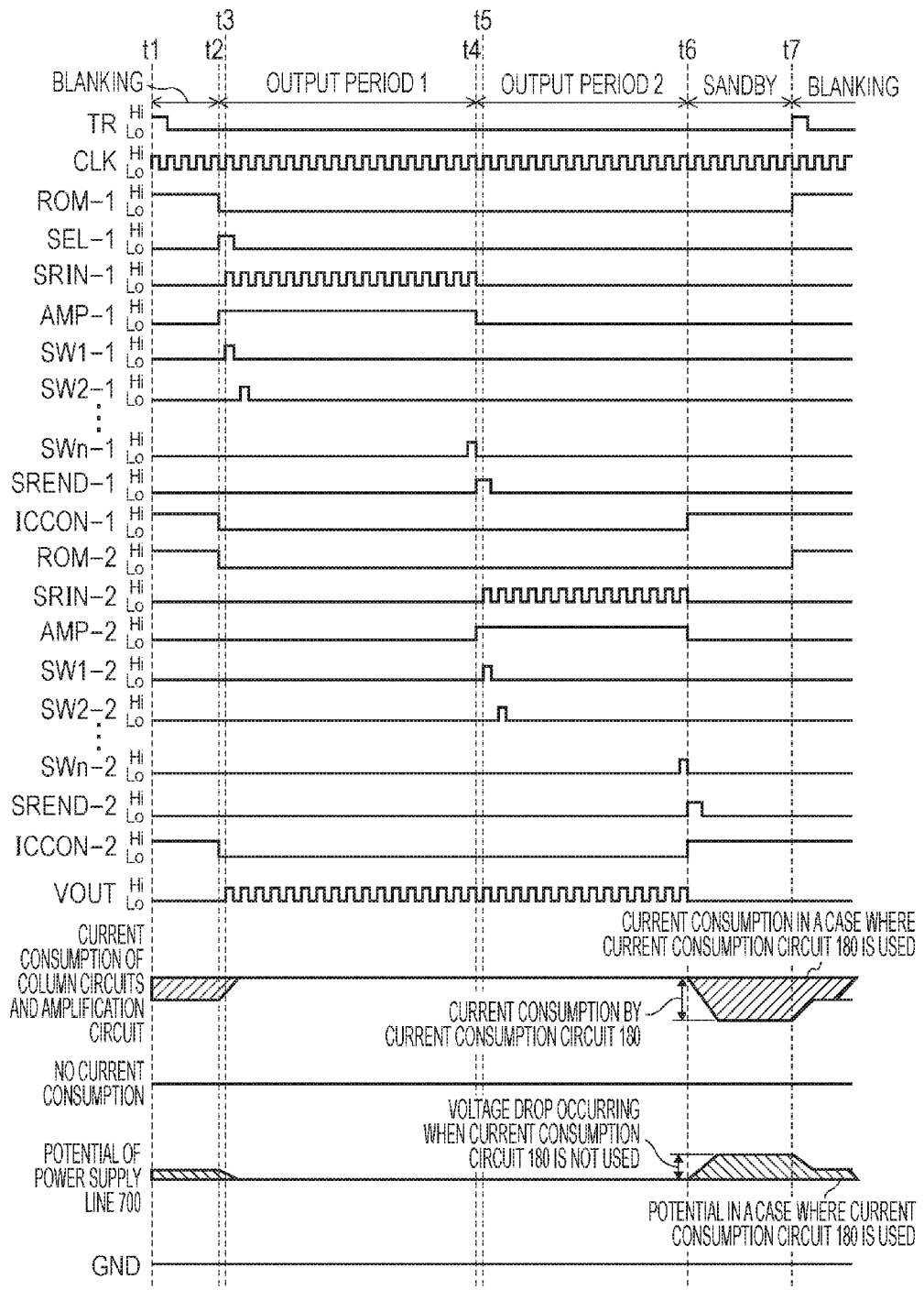
FIG. 11 is a diagram illustrating an example of an operation of a photoelectric conversion device.

FIG. 11 illustrates an example of a timing chart according to the fourth embodiment. In FIG. 11, signals which have the same functions as those in FIG. 4 will be referred to with the same reference signs as those in FIG. 4.

The timing chart illustrated in FIG. 11 is different from the timing chart illustrated in FIG. 4 in that a start signal for a signal ICCON for driving the current consumption circuit 180 is provided as a signal ROM for operating the column circuits 150 and 151 and a signal SREND-2 for starting the standby period.

When the signal ROM turns to the H level at time t1, the signals ICCON-1 and ICCON-2 turn to the H level. Accordingly, the current consumption circuit 180 which is provided in each of the chips 100 and 101 performs an operation, and consumes current.

The signals ICCON-1 and ICCON-2 turn to the L level at time t2 at which the output circuit starts to operate, and the current consumption circuit 180 enters a non-operating state.

Then, when the signal SREND-2 at the H level is supplied to the pad 270 at time t6, the signals ICCON-1 and ICCON-2 turn to the H level again. Accordingly, the current consumption circuit 180 which is provided in each of the chips 100 and 101 performs an operation, and consumes current.

As described in the first embodiment, during the standby period, the column circuits 150 and 151 are in a power save (low power consumption) mode. Therefore, the current consumption during the standby period is smaller than the blanking period.

Furthermore, during the blanking period, the output circuit is in a power save (low power consumption) mode. Therefore, the current consumption during the blanking period is smaller than the output period.

In the fourth embodiment, the current consumption by the current consumption circuit 180 during each period is set based on the current consumption during the output period during which the output amplifier 140 operates and a large amount of current is consumed. The current consumption setting data may be supplied to the pad 220 in advance.

The current consumption circuit 180 consumes current such that the current consumption during each of the standby period and the blanking period is equal to the current consumption during the output period during which the largest amount of current is consumed. Accordingly, variations in the potential of the current supply line 700 during each period may be reduced. Therefore, the S/N ratio of an output signal which is output by the output amplifier 140 may further be improved.

Fifth Embodiment

In a fifth embodiment, the operating period of the current consumption circuit 180 is shorter than that of the photoelectric conversion device according to the fourth embodiment.

Next, a photoelectric conversion device according to the fifth embodiment will be described below with reference to drawings by focusing on differences from the fourth embodiment.

Figure 12:
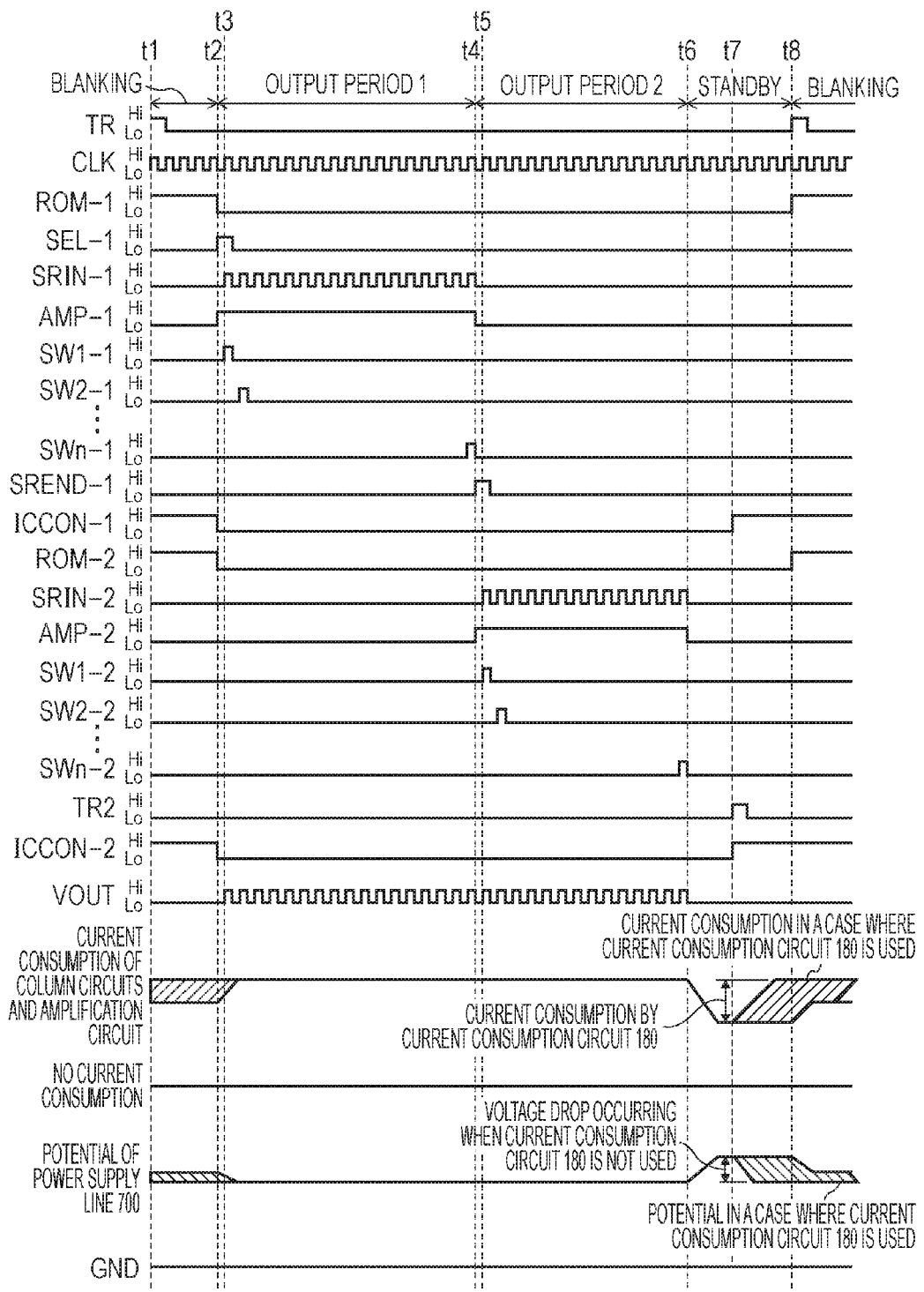
FIG. 12 is a diagram illustrating an example of an operation of a photoelectric conversion device.

FIG. 12 illustrates an example of a timing chart in the fifth embodiment. In FIG. 12, signals which have the same functions as those in FIG. 11 are referred to with the same reference signs as those in FIG. 4. The photoelectric conversion device according to the fifth embodiment is the same as that illustrated in FIG. 9.

In the photoelectric conversion device according to the fifth embodiment, as a start signal for a signal ICCON for driving the current consumption circuit 180, a signal ROM for operating the column circuits 150 and 151 and a signal TR2 as a signal for starting the standby period from the outside to the pad 270 are provided.

When the signal TR2 at the H level is supplied to the pad 270 at time t7, signals ICCON-1 and ICCON-2 turn to the H level. Accordingly, the current consumption circuit 180 which is provided in each of the chips 100 and 101 performs an operation, and consumes current. During the next output period, that is, at time t2 at which the output circuit operates, the signals ICCON-1 and ICCON-2 turn to the L level, and the current consumption circuit 180 enters a non-operating state.

The current consumption setting data may be supplied to the pad 220 or the pad 270 in advance.

In the photoelectric conversion device according to the fourth embodiment, the period during which the current consumption circuit 180 consumes the largest amount of current is a period from time t6 to time t8 in FIG. 11 (corresponding to a period from time t6 to time t8 in FIG. 12). In the photoelectric conversion device according to the fifth embodiment, the period during which the largest amount of current is consumed may be reduced by a period from time t6 to time t7 in FIG. 12. That is, at time t6 in FIG. 12 at which the second period, which is the standby period, starts, the current consumption circuit 180 does not operate. Then, within the second period, which is the standby period, the current consumption circuit 180 starts an operation for consuming current. Accordingly, compared to the photoelectric conversion device according to the fourth embodiment, power consumption by the photoelectric conversion device may be reduced. Furthermore, generation of heat caused by consumption of current at the current consumption circuit 180 may be decreased compared to the photoelectric conversion device according to the fourth embodiment. Therefore, an increase of noise contained in an output signal output from the output amplifier 140, which is caused by a temperature increase, may be suppressed, and the S/N ratio may thus be improved compared to the photoelectric conversion device according to the fourth embodiment. Furthermore, power consumption may vary according to the number of chips of the photoelectric conversion device, and the power consumption by the photoelectric conversion device increases as the number of chips increases. In such a case, effects of the fifth embodiment may further be expected.

Sixth Embodiment

Figure 13:
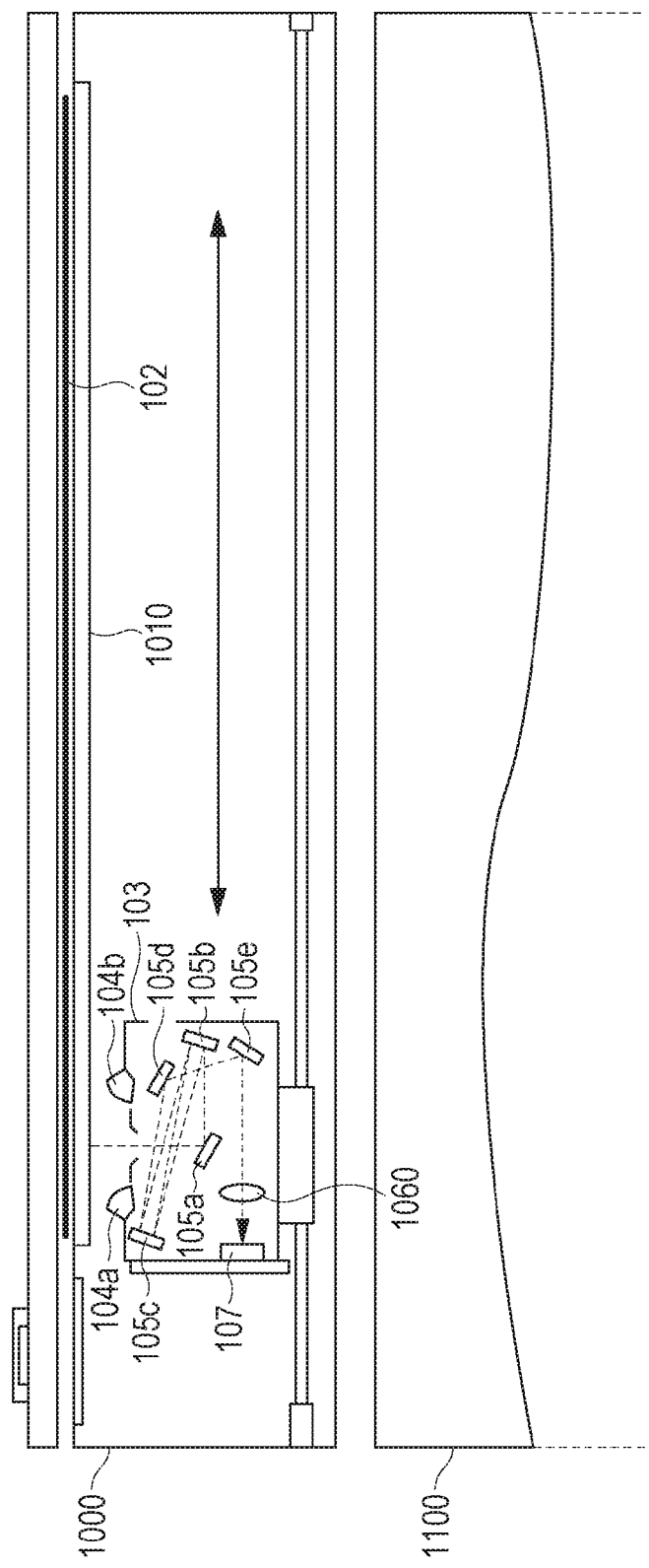
FIG. 13 is a diagram illustrating an example of a configuration of an image reading device.

FIG. 13 is a cross-section diagram illustrating an internal configuration of an original reading device, which is an image reading device. A well-known image forming unit 1100 is provided below an original reading device 1000. The original reading device 1000 and the image forming unit 1100 form an imaging forming apparatus. An image forming unit of an electrophotographic type is an example of the well-known image forming unit 1100. The image forming unit of the electrophotographic type forms an image by developing an electrostatic latent image formed on a photosensitive drum to a toner image and transferring the toner image to a recording medium such as paper. An image forming apparatus according to a sixth embodiment may form an image read by the original reading device 1000 onto a recording medium by the image forming unit 1100.

A sheet (hereinafter, referred to as an original) 102 on which an image is formed as an object to be read, is placed on an original platen glass 1010. When a user presses a reading start button (not illustrated in FIG. 13), a reading unit 103 moves in a direction of an arrow in FIG. 13, and reads the original 102.

When moving in the direction of the arrow, the reading unit 103 causes white light emitting diodes (LEDs) 104a and 104b as a light emitting unit which is arranged above the reading unit 103 to emit light, and the original 102 is irradiated with light.

The reading unit 103 is a reading unit of a shrinkage optical system which includes the LEDs 104a and 104b, a plurality of return mirrors 105a, 105b, 105c, 105d, and 105e, a condensing lens 1060, and a complementary metal-oxide semiconductor (CMOS) sensor 107.

The photoelectric conversion device according to each of the foregoing embodiments may be used as the CMOS sensor 107.

Light which is applied to the original 102 by the LEDs 104a and 104b is reflected by the original 102. The light which is reflected by the original 102 is reflected by the return mirrors 105a, 105b, 105c, 105d, and 105d, and then condensed by the condensing lens 1060 to the CMOS sensor 107, which is a line sensor. The CMOS sensor 107 includes a light receiving element. The light receiving element performs photoelectric conversion of incident light, and outputs an electric signal which corresponds to the amount of incident light.

Figure 14:
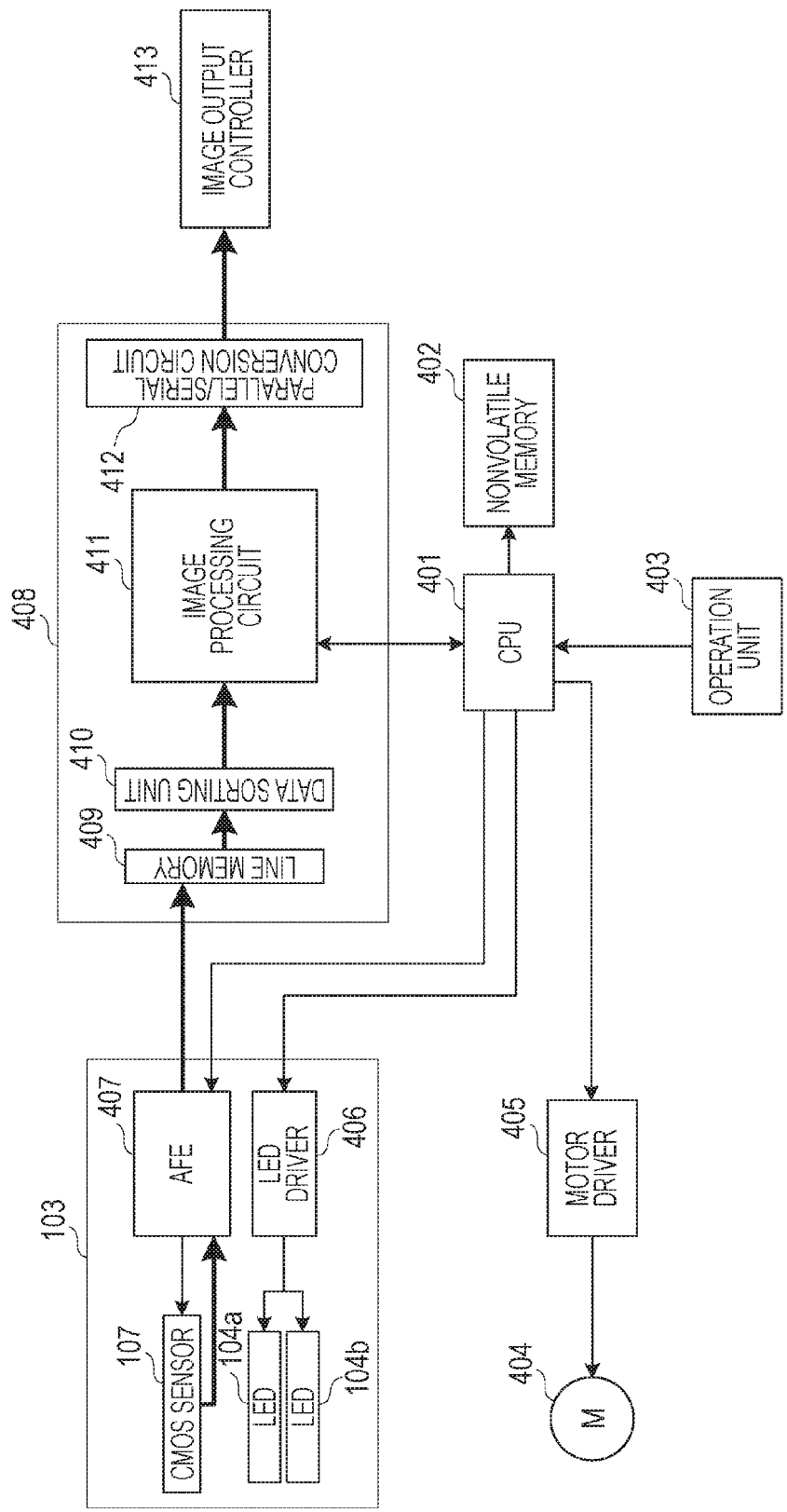
FIG. 14 is a diagram illustrating an example of a configuration of an image forming apparatus.

FIG. 14 is a block diagram of the original reading device 1000 according to the sixth embodiment.

A central processing unit (CPU) 401 reads a control program which is stored in a nonvolatile memory 402, and controls the entire original reading device 1000. An operation unit 403 is a user interface which allows a user to perform setting of a copy mode such as a color/monochrome copy mode or a single-sided/both-sided copy mode, and input an instruction to start copy. A motor 404 moves the reading unit 103 in a sub-scanning direction. A motor driver 405 supplies an excitation current for controlling the motor 404 to rotate, upon receiving a timing signal from the CPU 401.

An LED driver 406 supplies current for causing the white LEDs 104a and 104b to emit light, upon receiving a timing signal from the CPU 401.

An analog front end (AFE) 407 performs analog processing such as sampling and holding processing, offset processing, and gain processing on an analog voltage signal which is output from the CMOS sensor 107, and converts the analog-processed voltage signal into digital data (hereinafter, referred to as luminance data). In the sixth embodiment, the digital data has 8 bits (0 to 255).

An operation of an image processing unit 408 will now be explained. Read data which is output from the AFE 407 is stored into a line memory 409. The line memory 409 holds read data from the CMOS sensor 107.

A data sorting unit 410 rearranges RGB read data.

An image processing circuit 411 performs image processing such as shading correction processing and filter processing on the read data which is rearranged by the data sorting unit 410. Filtering and the like for image processing are set in a register within the image processing circuit 411 by the CPU 401 when power is turned on.

A parallel/serial conversion circuit 412 converts the read data, on which various types of image processing have been performed, output as parallel data from the image processing circuit 411 into serial data. The read data which has been converted into the serial data is transmitted to an image output controller 413.

Figure 15:
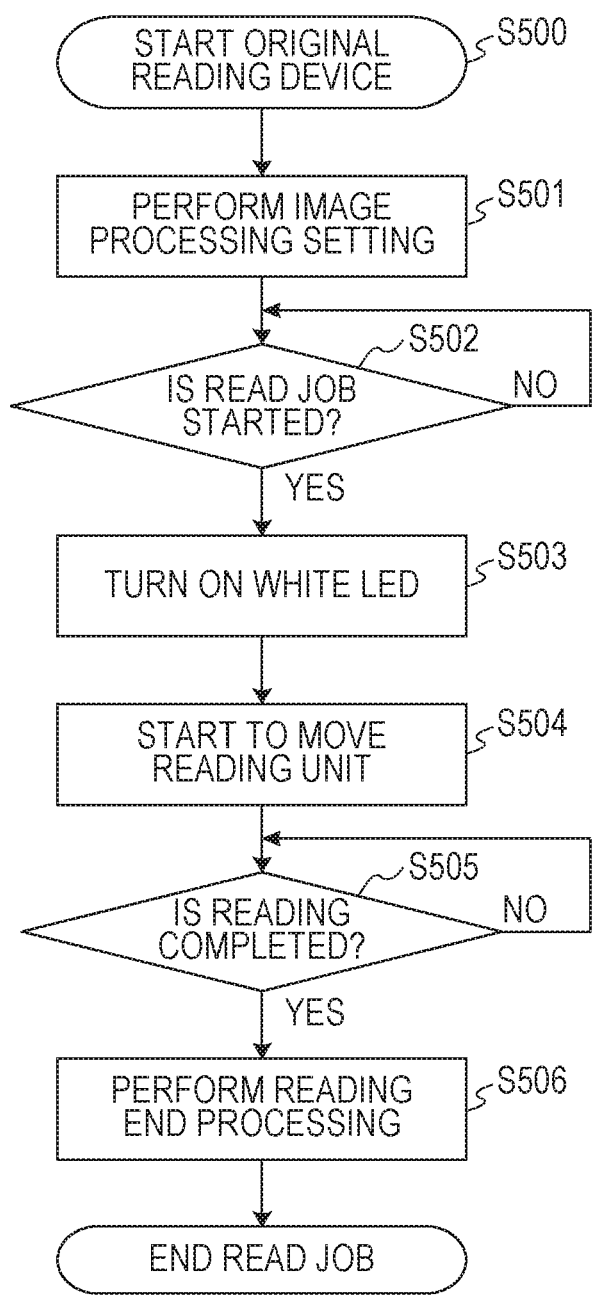
FIG. 15 is a diagram illustrating an example of control of an image forming apparatus.

FIG. 15 is a control flowchart of the CPU 401 according to the sixth embodiment.

When a user turns on the power of the original reading device 1000, the CPU 401 performs an initial operation including processing for starting an original reading device control program and processing for adjusting the amount of light of an LED light source (start original reading device 1000: S500).

Next, the CPU 401 sets data which corresponds to setting of image processing in the register within the image processing circuit 411 (S501).

Then, the CPU 401 waits for a read job start instruction from the operation unit 403 (S502).

When the read job start instruction is input by the user (Yes in S502), the CPU 401 causes the white LEDs 104a and 104b as a light source to emit light (S503). The CPU 401 outputs a control signal to the LED driver 406, and the LED driver 406 supplies current to the LEDs 104a and 104b to cause the LEDs 104a and 104b to emit light.

Then, the CPU 401 outputs a control signal to the motor driver 405, and the motor driver 405 drives the motor 404 to move the reading unit 103 in the sub-scanning direction (S504).

When reading is completed (Yes in S505), the CPU 401 turns off light of the LEDs 104a and 104b, and performs control for causing the original reading device to enter a wait-for-job state. Then, reading end processing is performed (S506).

As described above, the photoelectric conversion device described in the foregoing embodiments may be used for an image reading device and an image forming apparatus.

The foregoing embodiments merely illustrate concrete examples of implementing the present invention, and the technical scope of the present invention is not to be construed in a restrictive manner by the embodiments. That is, the present invention may be implemented in various forms without departing from the technical spirit or main features thereof. Furthermore, the present invention may be implemented by combining the foregoing embodiments.

According to the present invention, variations in the potential of a current supply line may further be suppressed. Therefore, the S/N ratio of an optical signal may be improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-142508, filed Jul. 16, 2015, which is hereby incorporated by reference herein in its entirety.

What is claimed is:

1. A photoelectric conversion device comprising:
a plurality of photoelectric conversion units configured to generate optical signals by performing photoelectric conversion of incident light;
a plurality of column circuits configured to sequentially output signals based on the optical signals by being scanned;
an output circuit configured to sequentially receive the signals based on the optical signals; and
a current consumption circuit configured to consume current,
wherein a sum of current consumptions per unit time of the plurality of column circuits in a first state in which the plurality of column circuits output the signals based on the optical signals is greater than a sum of current consumptions per unit time of the plurality of column circuits in a second state in which the plurality of column circuits do not output the signals based on the optical signals,
wherein a current consumption per unit time of the output circuit in a third state in which the output circuit outputs the signals based on the optical signals is greater than a current consumption per unit time of the output circuit in a fourth state in which the output circuit does not output the signals based on the optical signals,
wherein during a first period, the plurality of column circuits are in the first state, and the output circuit is in the fourth state,
wherein during a second period, the plurality of column circuits are in the second state, and the output circuit is in the fourth state,
wherein a sum of current consumptions per unit time of the plurality of column circuits and the output circuit during the first period is greater than a sum of current consumptions per unit time of the plurality of column circuits and the output circuit during the second period, and wherein the current consumption circuit consumes current such that a difference between the sum of current consumptions during the first period and the sum of current consumptions during the second period is reduced.

2. The photoelectric conversion device according to claim 1, wherein the first period is a period immediately after the second period, and wherein at a start time of the second period, the current consumption circuit does not operate, and after that within the second period, the current consumption circuit starts an operation for consuming current.

3. The photoelectric conversion device according to claim 2, wherein during a third period, the plurality of column circuits are in the second state, and the output circuit is in the third state, and wherein the current consumption circuit consumes current such that a difference between a sum of current consumptions per unit time of the plurality of column circuits and the output circuit during the third period and a sum of current consumptions during the second period is reduced.

4. The photoelectric conversion device according to claim 3, wherein the current consumption by the current consumption circuit decreases in the order of the second period, the first period, and the third period.

5. The photoelectric conversion device according to claim 2, wherein the current consumption circuit performs an operation for consuming current during the second period, and does not operate during the first period.

6. The photoelectric conversion device according to claim 2, further comprising:
    a plurality of semiconductor substrates each configured to include the plurality of photoelectric conversion units, the plurality of column circuits, the output circuit, and the current consumption circuit.

7. The photoelectric conversion device according to claim 1, wherein during a third period, the plurality of column circuits are in the second state, and the output circuit is in the third state, and wherein the current consumption circuit consumes current such that a difference between a sum of current consumptions per unit time of the plurality of column circuits and the output circuit during the third period and a sum of current consumptions during the second period is reduced.

8. The photoelectric conversion device according to claim 7, wherein the current consumption by the current consumption circuit decreases in the order of the second period, the first period, and the third period.

9. The photoelectric conversion device according to claim 8, further comprising:
    a plurality of semiconductor substrates each configured to include the plurality of photoelectric conversion units, the plurality of column circuits, the output circuit, and the current consumption circuit.

10. The photoelectric conversion device according to claim 7, further comprising:
    a plurality of semiconductor substrates each configured to include the plurality of photoelectric conversion units, the plurality of column circuits, the output circuit, and the current consumption circuit.

11. The photoelectric conversion device according to claim 1, wherein the current consumption circuit performs an operation for consuming current during the second period, and does not operate during the first period.

12. The photoelectric conversion device according to claim 11, further comprising:
    a plurality of semiconductor substrates each configured to include the plurality of photoelectric conversion units, the plurality of column circuits, the output circuit, and the current consumption circuit.

13. The photoelectric conversion device according to claim 1, wherein during the second period, the plurality of photoelectric conversion units generate the optical signals.

14. The photoelectric conversion device according to claim 1, further comprising:
    a scanning circuit,
    wherein when the scanning circuit performs scanning of the plurality of column circuits, the signals based on the optical signals are sequentially output from the plurality of column circuits to the output circuit.

15. The photoelectric conversion device according to claim 14, further comprising:
    a plurality of semiconductor substrates each configured to include the plurality of photoelectric conversion units, the plurality of column circuits, the output circuit, and the current consumption circuit.

16. The photoelectric conversion device according to claim 1, further comprising:
    a plurality of semiconductor substrates each configured to include the plurality of photoelectric conversion units, the plurality of column circuits, the output circuit, and the current consumption circuit.

17. An image reading device that reads an image of an object, the image reading device comprising:
    a light emitting unit configured to apply light to the object; and
    the photoelectric conversion device according to claim 1.

18. An image forming apparatus comprising:
    an image reading device configured to read an image of an object; and
    an image forming unit configured to form an image using a signal output from the image reading device,
    wherein the image reading device includes
    a light emitting unit configured to apply light to the object, and
    the photoelectric conversion device according to claim 1.

* * * * *